Aug. 6, 1968     C. VAZQUEZ     3,396,257
MINIATURE CONTACT SET USING PRE-STRESSED COILED SPRING
Original Filed May 19, 1965     2 Sheets-Sheet 1
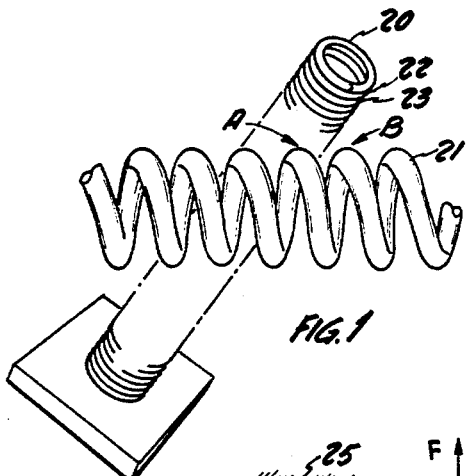
FIG.1
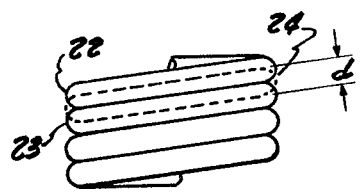
FIG.2
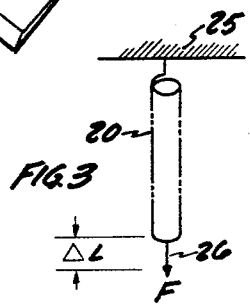
FIG.3
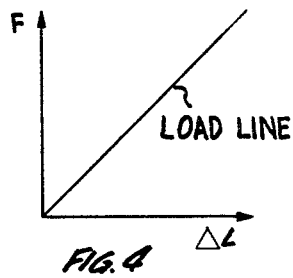
FIG.4
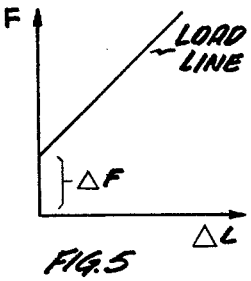
FIG.5
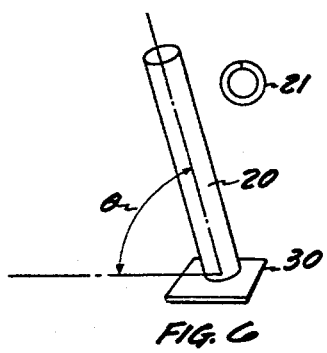
FIG.6
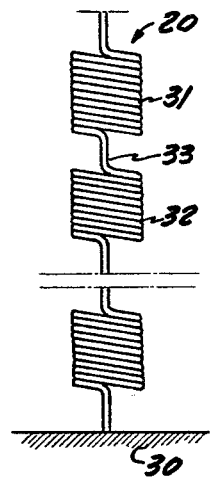
FIG.8
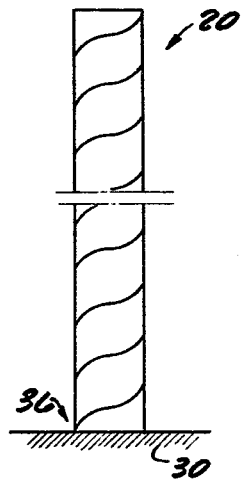
FIG.9
FIG.7
INVENTOR
CHARLES VAZQUEZ
BY
ATTORNEY Aug. 6, 1968 C. VAZQUEZ 3,396,257
MINIATURE CONTACT SET USING PRE-STRESSED COILED SPRING
Original Filed May 19, 1965  2 Sheets-Sheet 2

United States Patent Office 3,396,257
Patented Aug. 6, 1968

3,396,257
MINIATURE CONTACT SET USING PRE-STRESSED COILED SPRING
Charles Vazquez, Paris, France, assignor to International Standard Electric Corporation, New York, N.Y., a corporation of Delaware
Continuation of application Ser. No. 457,028, May 19, 1965. This application Mar. 28, 1967, Ser. No. 626,579
Claims priority, application France, May 26, 1964, 975,865
24 Claims. (Cl. 200—166)

ABSTRACT OF THE DISCLOSURE

A mobile contact in the form of a pre-stressed coiled finger spring is mounted in a fixed-free position so that its free end is able to move in any direction. An elongated stationary contact extends perpendicularly to the finger spring. The two contacts may engage each other at any one of many different locations responsive to movement of the free end of the finger spring. The stationary contact is formed to provide twin contact reliability regardless of the exact location where the two contacts touch each other.

This is a continuation of U.S. patent application Ser. No. 457,028, filed May 19, 1965, now abandoned.

This invention relates to contact sets generally suitable for use in electromechanical switching devices (especially —but not exclusively—crossbar switch contacts) and more particularly to miniature contact sets which occupy a minimum space and operate with a minimum bounce.

"Contact sets" generally involve two parts, either or both of which move either together for completing an electrical circuit or apart for breaking the electrical circuit. As used herein, the term "contact" may be applied to either or both of these two parts, and the term "contact surface" means the area on either of these two parts which touches the contact area on the other of the two parts.

Those who are skilled in the art will readily perceive many uses for electromechanical contacts. They will also understand the mechanical requirements for providing a truly successful set of contacts. Among other things, the probability of a simultaneous joint failure of two events is the product of the individual probabilities of a failure of each single event multiplied together. Thus, twin contacts have a probability of simultaneous failure which is extremely low, and virtually non-existent for most uses, as compared with the probability of a sole failure of either of the twin contacts acting alone. Conversely stated, twin contacts have an extremely high reliability factor. Also, mechanical contacts should open and close with a slight rubbing action so that they automatically clean each other every time that they operate. Yet another requirement for these mechanical contacts is that they should have very little or no bounce or parasitic oscillation regardless of the direction of contact motion. Still another requirement is a nearly perfect alignment between the two contact parts when they close.

The contact specifications described above are desirable for virtually all electromechanical contact devices. In the past, these devices were very often thin metal leaf springs having precious metal contacts attached to their ends. When the equipment using these contacts evolved into smaller sizes, the art has often turned to wire springs. However, these wire springs have sometimes tended to develop a bounce or parasitic oscillation. As long as these contacts worked in conjunction with electro-mechanical components, the bounce did not cause too much trouble because these components operated at a relatively slow speed such that they were fairly insensitive to the repeated opening and closing of the circuits responsive to the bouncing contacts. However, these contacts are now used very often in conjunction with electronic components which operate so fast that they can follow the individual bounces. Thus, almost any bounce (however slight) might cause errors which cannot be tolerated.

Accordingly, an object of the invention is to provide new and improved contact elements. In this connection, an object is to reduce the size of the contacts. Here, a further object is to eliminate virtually all contact bounce even when the contacts operate at a fairly high speed.

Yet another object of the invention is to provide contact devices which may be manufactured through a use of techniques which are compatible with the techniques which are used to manufacture electronic circuits.

In accordance with one aspect of the invention, these and other objects are accomplished by a use of a tightly wound coil spring (herein called a "finger spring") as the moving one of the two elements in a contact set. According to known techniques, the individual turns of this coil spring are pre-stressed to bear against each other. Thus, inter-turn friction creates an initial compression that induces spring stresses which are opposite to those occurring upon the spring when it is moved to close the set of contacts. The other or stationary part of the contact set is made from an element which is herein described, for want of a better term, as having a generally V-shaped slot—although the term V is to be construed broadly enough to cover all reasonably equivalent shapes. The jaws of this V-slot are close enough together so that the moving finger spring or coil element makes contacts at two points, one on each jaw of the V. The spacing of these jaws is also selected to cause the contacts to rub against each other, without jamming together, as they open or close.

The above mentioned and other features of this invention and the manner of obtaining them will become more apparent, and the invention itself will be best understood by reference to the following description of an embodiment of the invention taken in conjunction with the accompanying drawings in which:

FIG. 1 is a perspective view of the two contact elements which form a contact set;

FIG. 2 is a side plan view which shows a portion of the coiled finger spring and explains the meaning of the term "pre-stress" as used herein;

FIG. 3 is a schematic view of a suspended, fixed-free finger spring subjected to longitudinal forces, this view being shown here to explain how the amount of pre-stress may be specified;

FIG. 4 is a graph which is useful for explaining how a non-prestressed spring responds to the longitudinal forces of FIG. 3;

FIG. 5 is a similar graph for a pre-stressed spring;

FIG. 6 is a side view showing the miniature contact set in an open position;

FIG. 7 is another side view showing the same contact set in a closed position;

FIG. 8 shows a finger spring, as it might be manufactured, to provide a variegated or lumped compliance distributed along the length of the finger spring;

FIG. 9 shows an alternative method of manufacturing the finger spring by using a ribbon spring made as a tightly wound helicoid;

Figure 10:
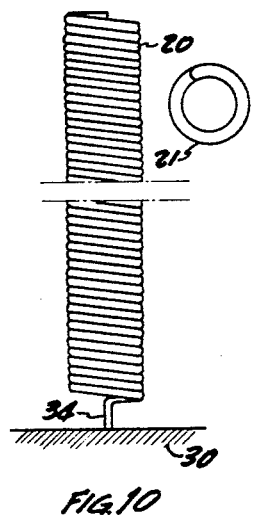
FIG. 10 shows a preferred embodiment of the finger spring construction in which a tightly wound coil spring forms the moving contact and a stretched coil spring shown in end view forms the stationary contact.

The perspective view of the contacts (FIG. 1) include a movable, tightly wound, coil finger spring contact 20 and a stationary stretched, coil spring contact 21. In this embodiment, both the movable finger spring 20 and the stationary contact spring 21 are preferably made from the same stock of coiled spring material. This way, the contact material is as nearly identical as the output of a continuous production run of initially homogeneous material can be made identical. This will tend to preclude any interaction between the materials at the contact surfaces, as where contact material tends to migrate or where electrolytic action causes a battery-like potential difference.

The finger spring 20 contact element is made from a wire which is coiled in a helicoid shape with the turns not only touching, but also pushing against each other, as turn 22 is shown touching turn 23 in FIG. 2. In greater detail, the pitch of turning given to the coils during manufacture is such that turn 23 is pre-stressed to lie in the space shown by the dashed line 24. However, FIG. 2 shows that the turn 22 is physically held in a space which is close up against the turn 23. Thus, even though stressed to lie in space 24, the turn 23 does not do so for the the very simple reason that two physical objects cannot occupy the same space at the same time.

The two turns 22, 23 push against each other to create friction forces that cause a fast damping of any spring oscillations, which would otherwise cause the finger spring to whip back and forth. Contrast this pre-stressed construction with that of the usual spring construction wherein each turn is normally wound with a pitch equal to the distance $d$, which is the same as the diameter of the spring wire. These turns may touch each other, but they do not push against each other. Here, there are no rubbing, friction caused forces, and the spring whips about if it is snapped.

Since the spring 20 is subjected to a mechanical pre-stress during the manufacturing process, it has a degree of rigidity which is strong enough to cause it to normally stand in an unoperated position—which may be either an opened or a closed contact condition with respect to the stationary contact 21. However, the degree of rigidity is weak enough to allow the spring to move to the operated position responsive to the normally expected electromechanical forces. Also, there is a nearly perfect damping of the oscillations which might otherwise occur when the finger spring moves, because of the friction which is produced between the turns of the spring.

FIGS. 3–5 explain one way of specifying the degree of pre-stressing which is desired for the finger spring. In greater detail, FIG. 3 shows that the spring 20 may be suspended at one of its ends from an anchor 25, and that a weight, applying force F, may be hung from the other end 26. The distance $\Delta L$ over which the force F stretches the spring 20 may be observed.

Graphically, this stretch-response is shown in FIGS. 4, 5 where the force F is plotted vertically, the change in length $\Delta L$ is plotted horizontally, and the load line represents the observed results. A non-pre-stressed spring (FIG. 4) wound so that the turns touch, but do not push against each other, displays a load line as shown in FIG. 4. As the force F increases by any amount, the spring increases in length by an amount $\Delta L$. The force F and length $\Delta L$ increase correspondingly and linearly. However, if the spring is wound with a pre-stress (FIG. 5) so that the turns push against each other, there is no significant increase $\Delta L$ in spring length as the force F increases up to a limit $\Delta F$. At the limit $\Delta F$, the applied force exactly equals the pre-stress forces. Thereafter, any further increase in the applied force F produces a corresponding linear increase $\Delta L$ in the spring length. Thus, the pre-stress characteristics of the finger spring may be described by the amount of force $\Delta F$ required to produce an appreciable change $\Delta L$ in the length of the spring.

Means are provided for giving twin contact reliability with no alignment problems. Briefly, when the preferred embodiment of FIG. 1 is viewed from the end of the finger spring, the stationary contact element 21 is seen as including a number of somewhat V shaped slots which are positioned adjacent the finger spring 20. In this preferred embodiment, the slot is obtained as by stretching one of the pre-stressed finger springs so that the individual turns open and remain open at a fairly uniform set with respect to the diameter of the finger spring. Since these open turns are uniformly distributed along the entire length of the stretched wire 21, there is no problem of contact alignment—the finger spring 20 may touch the stretched spring 21 at virtually any point and obtain a reliable twin contact operation.

Figure 11:
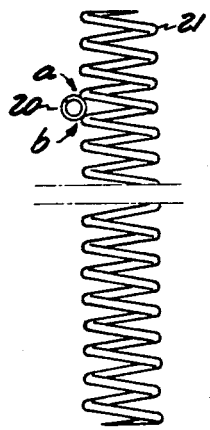
FIG. 11 is an alternative showing of the contacts of FIG. 10 wherein the contacts are rotated to provide another view which is displaced by 90° so that the stationary contact is shown in side view and the finger spring is shown in end view.
Figure 12:
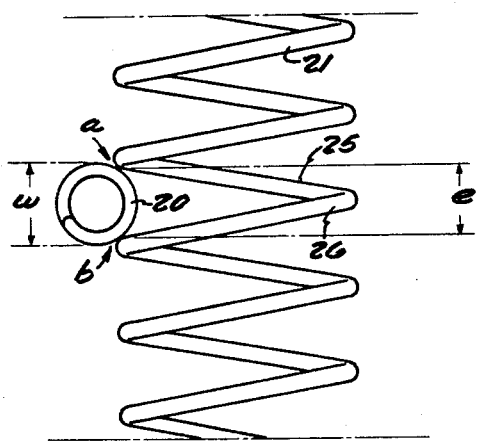
FIG. 12 shows an enlargement of a small section taken from FIG. 11.
Figure 16:
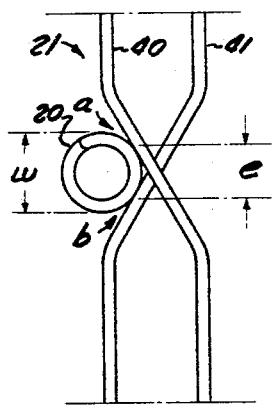
FIGS. 16 and 17 show two alternative methods of constructing dual elements in other embodiments of the invention.

In greater detail, as best seen in FIGS. 1, 11, and 12, the turns of the stretched stationary spring 21 form a somewhat V shaped slot defined by the jaws 25, 26 (FIG. 12). The set of this slot is such that—at its maximum width—it is open by a distance $e$ which engages two points on the circumference of the finger spring 20 when the two contact elements are touching. Thus, there are twin points of contact $a$ and $b$ which provide the desirable high grade of reliability. The width or diameter W of the finger spring 20 is select relative to the distance $e$ between the jaws of the V-slot at the point of contact so that there is no danger that the finger spring will become wedged between the jaws 25, 26 and thus be captured in a make condition. In one case, the points of contacts $a, b$ are at the outer ends of the jaws (FIG. 12) so that the finger spring may touch, but not enter, the V slot, and in another case the points of contacts are near the root of the jaws (FIG. 16) so that a wedging action is not possible.

The contact surfaces on both the finger spring and the stationary contact elements may be plated or covered with any known contact material. This is in keeping with the standard usage in the art, as where the contacts on a relay are very often small bars, domes, or other shaped sections of noble or precious metal welded at the ends of mating leaf springs. When the contact surfaces on springs 20, 21 touch each other, the contacts are described as "made" or "closed." When they do not touch, the contacts are described as "broken" or "open." In addition to the plating with the contact material, the entire finger spring 20 and stationary contact 21 may also be made from any acceptable contact material. There are many kinds of and advantages from a use of any of the various ones of these materials. Therefore, no further comments need be made relative to the particular contact metals used, except to note that those skilled in the art are expected to select a contact material which suits their particular need.

Also, the stationary contact spring element 21 is described herein as being stretched; whereas, in reality it will, of course, be formed with due care so that the jaws of the V shaped slot are well defined and within acceptable specification limits. Preferably, the stationary contact 21 is a bare wire spring so that the finger contact 20 may engage it at any one of many points, thereby reducing the contact alignment problems. In other cases, the stationary contact element 21 may begin as an insulated wire and the insulation may be removed at the points of contact.

FIG. 6 (and elsewhere in the drawings) shows open or make contacts, by way of example. However, it should be understood that an election could have been made to show any other suitable contact combination, such as break or transfer contacts.

Normally, the pre-stress tension of the finger spring and the angle of its anchorage in a ground block 30 forces the finger spring to its normal position (either opened or closed). The spring 20 is anchored in a clamped-free or fixed-free mode so that the upper end may swing in any direction responsive to a mechanical force applied to it. For example, the force F is shown in FIG. 7 as pushing the finger spring 20 into contact with the stationary element 21. When the force F is removed, the finger spring 20 moves back to the open contact position (FIG. 6) responsive to its own spring tension. Manufacturing economies result from this construction since the angle $\theta$ at which spring 20 sets in the block 30 and the angle of the applied force F are not at all critical. If the force F is applied in the general direction of spring 21, the two contacts will touch with twin contact reliability. If the angle $\theta$ is almost anything except the exact operated position, the contacts will spring apart when force F is removed. Hence, these two constraints (i.e. the angle $\theta$ and force direction F) may have as loose tolerances as other associated parts (not shown) will allow.

The finger spring 20 may take on a number of different forms depending upon the individual needs of any given system. For example, in FIG. 8, the coils of the finger spring may have a variable compliance which is lumped in selected spots. Thus, the drawing shows three coil spring sections (two of which are numbered 31, 32) separated by straight wire sections (as the wire section 33 separates the coil spring sections 31, 32). The straight wire sections may afford locations where the mechanical force F may be applied to move the finger spring. Or, under some unusual circumstances, the lumped compliances may be used to produce tuning effects upon certain modes of vibration.

The embodiment of FIG. 9 shows a helicoidal finger spring made from a metallic ribbon coiled in such a way that the turns overlap each other. The spring thus realized may also be fixed in an adequate clamped-free or fixed-free mode into a ground block 30. The spring might also be made from wire having any suitable cross section. A number of variations of the finger spring consists in making the contact element by means of a relatively rigid wire core having a braid coiled around it. The core might be a plastic, such as nylon. The braid may be in the form of either a wire or a coiled ribbon.

FIG. 10 shows the side view of a clamped-free or fixed-free finger spring 20. This finger spring may be mounted on a straight section of wire, as at 34 (FIG. 10); or, the entire helix may be set in the ground block 30, as at 36 (FIG. 9). FIG. 11 shows the same structure as that shown in FIG. 10 except that the view is rotated by 90° (i.e. FIG. 10 looks at the side and FIG. 11 looks into the end of finger spring 20). FIG. 12 shows a part of the same arrangement, but on a larger scale drawing so that the spatial relationships will be more apparent. In each of these figures, the electrical circuit is such that current runs into the contact set via finger spring 20, across the contact points $a$, $b$, and the stationary contact element 21 (or vice-versa).

Figure 13:
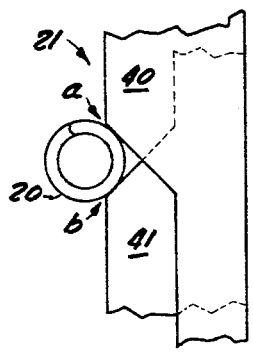
FIG. 13 shows an alternative embodiment of the invention wherein the finger spring makes contact between two stationary plate-like elements (herein called "dual elements")
Figure 14:
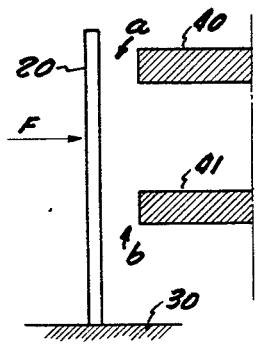
FIG. 14 shows how the finger spring of FIG. 13 stands relative to the two stationary contacts when the contacts are open.
Figure 15:
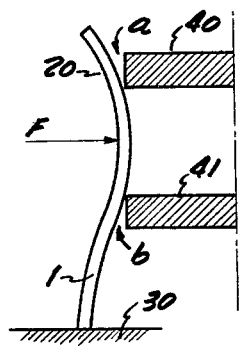
FIG. 15 shows how the finger spring of FIG. 13 moves to close the contacts.

A somewhat more complex arrangement features a dual element combination of contacts as shown in FIGS. 13-17. Each of these figures shows two separate and electrically isolated contacts as an upper contact 40 and a lower contact 41. A circuit is completed through these contacts when they are bridged by the finger spring 20. More particularly, as shown in FIG. 14, the upper and lower contacts 40, 41 are insulated from each other when the finger spring 20 is in a released or normal position. When a force F is applied to the finger spring 20, it bends and bridges contacts 40, 41. Then, current may enter into the contact set via the contact 40, travel down the finger spring 20, and exit via contacts 41 (or vice-versa).

Figure 17:
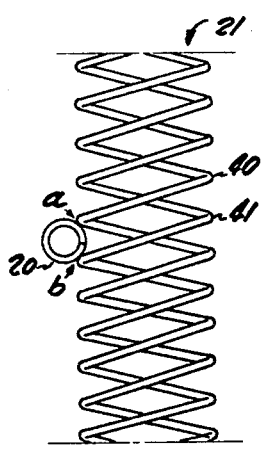

In the dual element case of FIG. 13, the upper and lower contacts are formed by a pair of flat plate-like members cut diagonally to cooperate with each other by forming a somewhat V shaped slot. In the dual element case of FIG. 16, two initially straight bare wires are bent diagonally to form a similar cooperating V slot. In each case, the drawing shows only a single point of contact per jaw or contact member. However, as described above, both upper and lower elements 40, 41 may be given a complete V slot to provide the twin, rubbing contacts which enhance reliability. FIG. 17 shows a variation wherein two coil springs are co-axially intertwined or imbricated to provide the upper and lower stationary contacts 40, 41 which are bridged by the finger contact 20.

The principle of the intertwined springs may also have special value when used as a strength producing device. That is, two coiled springs may be used together for controlling the rigidity of the stationary contact element 21 if the turns of a first coil spring bear against the turns of the second spring and tend to stretch the second spring while the turns of the stretched coil spring bear against and tend to compress the first coil spring. This same principle may, of course, also be used in connection with the finger spring to control its rigidity. In any event, two springs, one in compression and the other in tension, may be used to make a fairly rigid structure. This is especially valuable where an unsupported stationary contact must bridge a relatively long gap.

Figure 18:
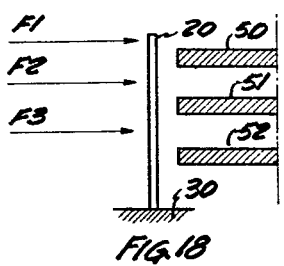
FIGS. 18 and 19 show how the invention may be expanded to cover further embodiments including three or more contacts (herein called "multiple contacts").
Figure 19:
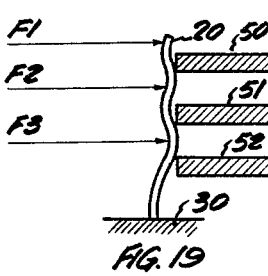

Another way of using the finger spring is as part of a switching multiple, as shown in FIGS. 18 and 19. Here, there are a plurality of stationary contacts 50-52 which may be insulated from each other. The finger spring 20 normally stands (FIG. 18) out of engagement with each and all of these contacts so that all are open circuited.

If a force F1 is applied to the top of the finger spring 20 (FIG. 18) it bends and makes contact with stationary element 50. The lower part of the finger spring 20 bows away from contacts 51, 52, and they remain open circuited. If a force F2 is applied, the finger spring 20 shorts the contacts 50, 51 while leaving contact 52 open circuited. Likewise, force F3 results in a shorting of the contacts 51, 52 while leaving the contact 50 open circuited. If all three of these forces are applied simultaneously, the result is a shorting of all three contacts.

Those skilled in the art will readily perceive other manners of using the principles of the invention. It should be understood that the principles may be expanded to provide not only the exact embodiments here shown, but also to provide all of the alternative embodiments which reasonably suggest themselves. Therefore, the appended claims are to be construed broadly enough to cover all equivalents which reasonably fall within the true spirit and scope of the invention.

I claim:

1. An electro-mechanical contact set comprising a pair of electrically conductive parts which may be moved together or apart to make or break an electrical circuit, at least one of said parts being a movable coiled finger spring element having pre-stressed turns for creating an initial state which induces spring stresses that oppose the stresses which are due to the loading on the spring as it moves, the other of said parts having at least one generally V shaped slot therein positioned adjacent to and and opening toward the finger spring, the spacing of the jaws of said V shape being such that said finger spring and said other part make electrical contact at at least two points, and means for selectively moving said finger spring into and out of said V shaped slot.

2. The contact set of claim 1 wherein said jaws are spaced apart by a distance relative to the diameter of said finger spring which precludes a capturing of said finger spring responsive to its wedging into said V shaped opening.

3. The contact set of claim 1 wherein said jaws are spaced apart by a distance relative to the diameter of said finger spring which is adequate to cause a rubbing action as said contact elements open and close.

4. The contact set of claim 1 wherein said finger spring makes contact with said V shaped slot at any suitable point along the length of its said coil spring, thereby avoiding the need for special contact tips.

5. The contact set of claim 1 wherein said other part is a dual element combination of contacts comprising two stationary parts normally insulated from each other, said finger spring being positioned to short circuit said dual elements together when said finger spring is moved to said V shaped slot.

6. The contact set of claim 5 wherein each of said dual elements comprises a flat plate having a part diagonally cut therein, said diagonal cuts being positioned relative to each other and to said finger spring to form said jaws of said V shaped slot.

7. The contact set of claim 5 wherein each of said dual elements comprises a wire bent to have a diagonal section, the diagonal section of each wire forming one of the jaws of said V shaped slot.

8. The contact set of claim 5 wherein each of said dual elements comprises a coil spring with separated turns, said two coil springs being co-axially intertwined, one turn on each of said springs forming a jaw of said V shaped slot.

9. The contact set of claim 1 wherein said other part comprises a multiple of contact elements, each element in said contact multiple being insulated from every other element in said multiple, said finger spring standing adjacent said multiples, means for selectively applying a mechanical force at any one of several points along the length of said finger spring, and means responsive to motion of said finger spring for selectively short circuiting at least two of said elements.

10. The contact set of claim 1 wherein both of said pair of electrically conductive parts are coiled spring, the turns in one of said coiled springs being tightly wound and the turns in the other of said coiled springs being stretched apart so that adjacent turns form said V shaped slot.

11. The contact set of claim 10 wherein each of said coiled springs are substantially identical except for the spacing of said turns.

12. The contact set of claim 10 wherein said two points of electrical contact are made between the circumference of said tightly wound spring and adjacent turns of said stretched coil spring.

13. The contact set of claim 12 wherein the diameter of said tightly wound spring is more than the greatest distance between the adjacent turns of said stretched coil spring.

14. The contact set of claim 1 wherein said other part is formed so that said finger spring passes between the jaws of said V shaped slot and engages the jaws of the V near the root of said V.

15. The contact set of claim 1 wherein said finger spring is formed with a variable compliance which may be lumped at particular places throughout its length.

spring comprises a helicoid made from a metallic ribbon coiled so that the turns of said ribbon overlap each other.

17. A contact set comprising a pre-stressed, coiled finger spring contact positioned adjacent at least a pair of spatially separated contact surfaces, the turns of said coiled spring pushing against each other with a mechanical force which provides a substantial inter-turn friction, said finger spring being separated from both of said contact surfaces when said contact set is in an open contact position, and means for selectively moving said finger spring so that at least some of the turns of said coiled spring make simultaneous contact with said pair of contact surfaces.

18. The contact set of claim 17 wherein said pair of contact surfaces are the adjacent turns of a second coiled spring having its turns stretched apart.

19. The contact set of claim 17 wherein said pair of contact surfaces are laterally displaced along the length of said finger spring.

20. The contact set of claim 19 wherein said pair of contact surfaces are electrically insulated from each other, said finger spring shorting said two surfaces together when moved into contact therewith.

21. The contact set of claim 20 wherein each of said contact surfaces is on a diagonal face of a conductive plate.

22. The contact set of claim 20 wherein each of said contact surfaces is on a diagonal face of a bent wire.

23. The contact set of claim 20 wherein each of said contact surfaces is on the adjacent turns of two intertwined co-axially positioned coil springs.

24. The contact set of claim 20 wherein a plurality of said contact surfaces are arranged in multiple.

References Cited
UNITED STATES PATENTS

| | | | |
|---|---|---|---|
| 2,573,895 | 11/1951 | Evett | 200—166 |
| 2,816,181 | 12/1957 | Mann et al. | 200—166 |
| 2,905,794 | 9/1959 | Upton | 200—166 |

ROBERT K. SCHAEFER, *Primary Examiner.*

H. O. JONES, *Assistant Examiner.*